United States Patent [19]

Swenson

[11] 4,241,427
[45] Dec. 23, 1980

[54] CONDITION RESPONSIVE CABLE WITH BENDABLE COAXIAL SENSOR MOUNT

[75] Inventor: Richard C. Swenson, Carriere, Miss.

[73] Assignee: The United States of America as represented by the Secretary of the Navy, Washington, D.C.

[21] Appl. No.: 955,542

[22] Filed: Oct. 27, 1978

[51] Int. Cl.³ .............................................. G01V 1/38
[52] U.S. Cl. ..................................... 367/20; 367/154; 174/101.5
[58] Field of Search .......................... 367/15, 20, 154; 174/101.5

[56] References Cited

U.S. PATENT DOCUMENTS

| | | |
|---|---|---|
| 2,837,731 | 6/1958 | Harris ................................... 367/154 |
| 2,923,916 | 2/1960 | Woodworth ......................... 367/154 |
| 3,155,768 | 11/1964 | Garshick ............................. 174/101.5 |
| 3,518,677 | 6/1970 | Florian . |
| 3,531,760 | 9/1970 | Whitfill, Jr. . |
| 3,689,875 | 9/1972 | Kostelnicek . |
| 3,729,919 | 5/1973 | Weichardt et al. ............... 174/101.5 |
| 3,781,778 | 12/1973 | Sawin et al. ...................... 174/101.5 |
| 3,939,464 | 2/1976 | Swenson .............................. 367/154 |
| 4,012,649 | 3/1977 | Cook .................................... 367/154 |

Primary Examiner—Howard A. Birmiel
Attorney, Agent, or Firm—Richard S. Sciascia; Harvey A. David

[57] ABSTRACT

A condition responsive line array cable having pairs of conductor containing, hollow braided strands plaited into a hollow braid in which transducer mounts are enmeshed and gripped. The mounts comprise a rigid plastic tubular housing in which a rubber jacketed transducer is resiliently suspended by elastomeric projections. Resiliently flexible, hollow, tapered, rubber fairings extend from each end of the housing and are slit to admit wires pulled from a cable strand. The fairings are long relative to the housing diameter and are retained assembled with the housing by cooperating ribs and grooves.

11 Claims, 3 Drawing Figures

CONDITION RESPONSIVE CABLE WITH BENDABLE COAXIAL SENSOR MOUNT

BACKGROUND OF THE INVENTION

This invention relates to condition sensing cable devices useful in oceanographic work, and more particularly to an improved cable construction of the type comprising a plurality of hydrophones or other transducers spaced along a cable to form a line array.

Devices of the foregoing character are at times deployed by streaming horizontally from a moving tow vessel, and at times are suspended vertically in the water. In any event, size, weight, and particularly flexibility of the cable type of line array device are important factors affecting ability to handle, deploy, recover, and store the device using available deck machinery and without the requirement of additional special handling equipment. Another important consideration is the capability of the cable array, and particularly the wire conductors and transducer elements, to withstand the bending, flexing, and jerking forces imposed by either being towed from a vessel or suspended from a buoy subjected to surface wave action.

A variety of hydrophone cable or line array devices have been used or proposed in the past having a plurality of discrete sensors spaced therealong. Examples include those described in U.S. Pat. No. 3,518,677 to E. F. Florian, and No. 3,531,760 to W. A. Whitfill, Jr. All of the foregoing are relatively complex, expensive, and as a very important consideration are not readily made up or changeable on site as to transducer number and location along the cable.

Among recent materials advances that have contributed to lighter, stronger and more flexible electroacoustic cable devices is that of aramid fibers which are characterized by their strength, high resistance to stretch, their lightness in weight, and their flexibility. U.S. Pat. No. 3,939,464 to R. C. Swenson, the inventor herein, discloses a cable sensor mount in combination with a cable comprising aramid fibers formed in four sections, each separately covered, and a plurality of groups of conductors lying in the interstices between the fiber sections, the cable sections and conductors all being held together and protected by a braided cover of nylon, or the like. The sensor mount comprises a cylindrical, open, sensor housing framework or cage, preferably of stainless steel, and a pair of relatively short tapered flexible polyurethane cones or fairings fixed to opposite ends of the cage. The mount is inserted between or among the fiber sections that have been spread apart and lie in four parallel grooves defined in the cage and fairings. The cage structure comprises split ring ends connected by grooved strongbacks and fastened to additional end rings by screws. The end rings comprise formed extensions of the strongback grooves and are aligned with the grooves in the flexible fairings.

While the just described cable and sensor mount construction has provided a notable improvement over the earlier mentioned prior art with respect especially to versatility and flexibility, the cable and sensor mount structures are rather complex, expensive to manufacture bulkier and less flexible than desired.

SUMMARY OF THE INVENTION

With the foregoing in mind, it is a principal object of this invention to provide an improved free flooding, bendable, condition sensing cable construction for use in oceanographic or other applications.

Another important object of the invention is to provide a novel and improved cable and transducer or sensor mount, the construction of which allows great versatility in placement of discrete hydrophones, other transducers or sensor elements therealong.

As another object, the invention aims to provide an electroacoustic cable device of the foregoing character that uses pairs of strands of aramid or other high strength fibers, which strand pairs are woven or braided into a braided rope or cable form that can be readily expanded, by applying an axially compressing force on the cable, to receive individual transducer housings which are then held tightly in place when the cable device is under tension.

Another object of this invention is the provision of an improved transducer housing in combination with braided cable to provide a versatile, flexible, easily handled, deployed, and stored condition responsive cable device.

Still another object is the provision of a cable device of the foregoing nature wherein individual transducers can be readily electrically connected in series or parallel with a minimum of wiring effort.

Yet another object is to provide a transducer or sensor mount for use in cable arrays and which is comprised entirely of inexpensively molded, non-metallic components which can be manually assembled in an interlocking manner without the requirement of screws, rivets or other fasteners.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
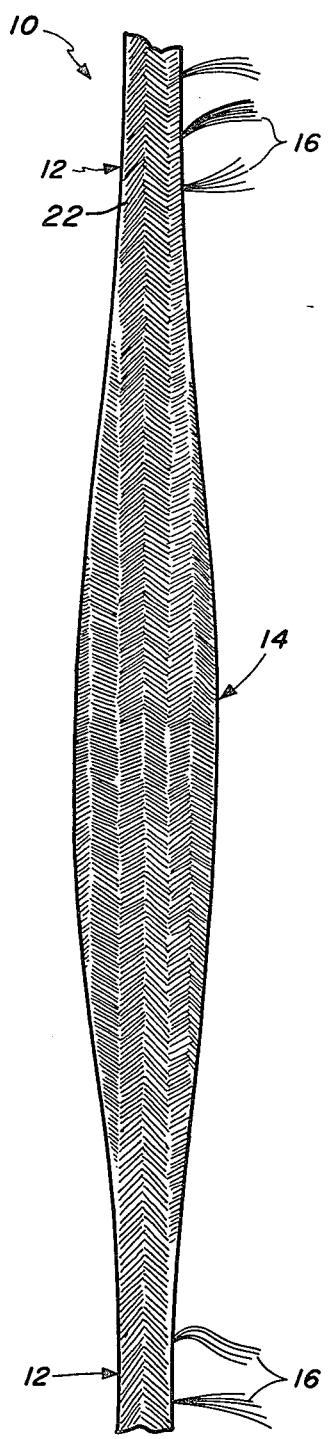
FIG. 1 is an elevational view of a segment of an electroacoustic cable device embodying the invention.

In the form of the invention illustrated in the drawings, and with reference first to FIG. 1, an electroacoustic cable device 10 comprises an elongate cable portion 12 and a plurality of hydrophone or other electroacoustic transducer stations, such as is indicated generally at 14, located at selected positions along the length of the device. The device 10 may be provided with flexible thrums or haired fairings 16 in the form of tufts of fibers, or other well known appendages for minimizing drag, particularly when the device is used in a vertical orientation and is either moved through the water or is stationary and subject to water currents. It will be understood, of course, that while this preferred embodiment is an electroacoustic device, the invention contemplates cables utilizing other forms of transducers or sensors, such as salinity detectors, thermistors, or the like.

Figure 2:
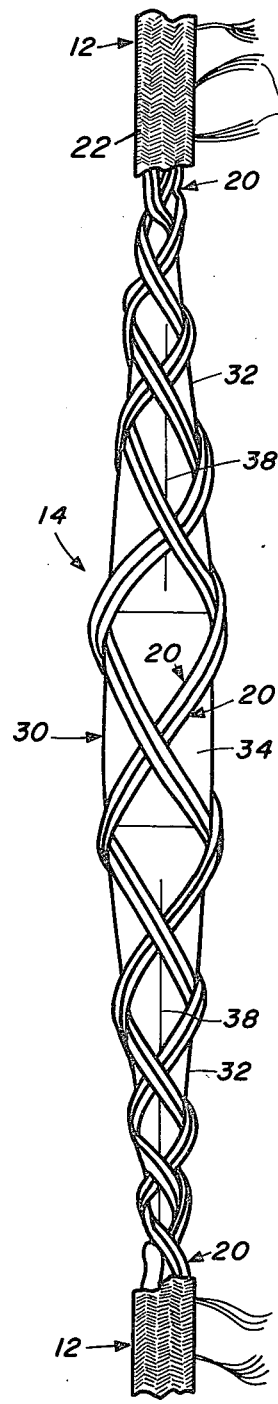
FIG. 2 is a view of the segment of FIG. 1 with a portion of protective covering removed to reveal cable strands and a transducer mount enmeshed therein.

Referring to FIG. 2, the cable comprises a hollow braid of a plurality of strands 20 of high strength fibers, preferably of one of the synthetic materials known as aramids, such as are sold under the name "KEVLAR" and exhibit great resistance to stretch or elongation. The strands 20 are braided or plaited in pairs and, in this example, comprise four such pairs for a total of eight strands. The strands 20 are each a hollow braid formed by braiding numerous yarns, each comprising many aramid filaments. As will later be discussed with reference to FIG. 3, one or more of the strands 20 is formed around a plurality of electrical conductors or wires.

The cable portion 12 preferably comprises a braided outer cover 22 of nylon or other suitable synthetic fiber that improves handling characteristics while reducing likelihood of snagging or abrasion damage. The fairings 16 are conveniently secured to the cover 22 and comprise tufts of limply flexible fibers.

The transducer stations 14 each comprise a transducer mount, indicated generally at 30 and comprising, in this embodiment, tapered, flexible boots or fairings 32 fixed to opposite ends of a rigid, cylindrical, transducer housing 34. The transducer mount 30 is entrapped or confined by the strands 20 in an expanded portion of the cable. It will be recognized that the strands 20 will grip the mount 30 with increasing tightness as the cable device 10 is put under tension, in much the same manner as the well known Chinese finger trap operates.

Figure 3:
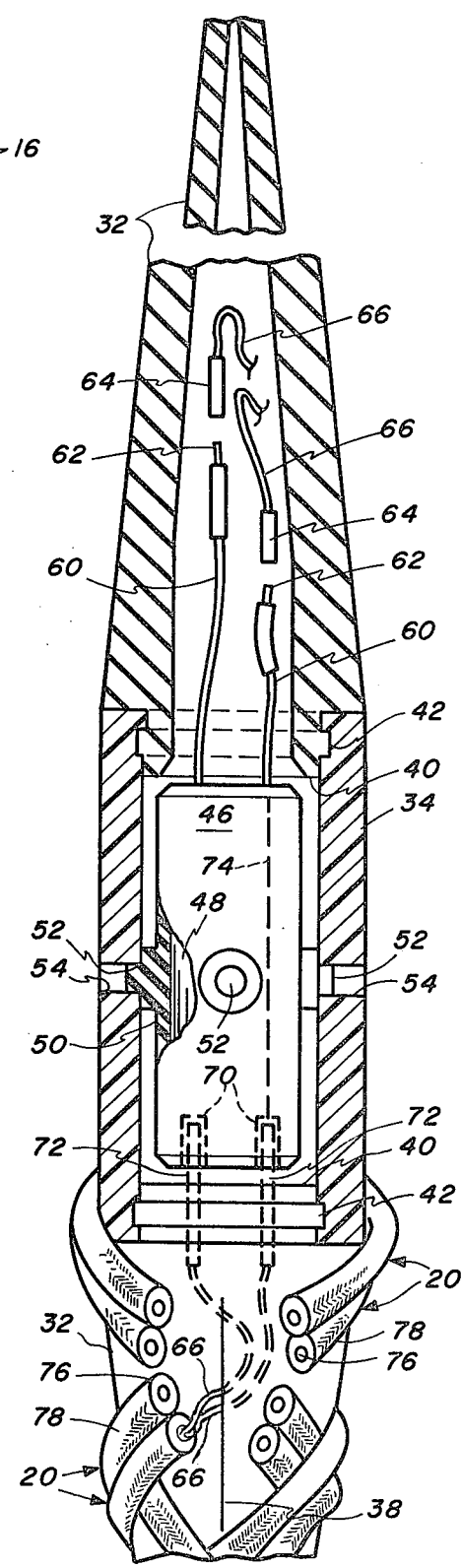
FIG. 3 is an enlarged fragmentary view, partly in section, illustrating the transducer mount construction and transducer electrical connections.

Referring now to FIG. 3, the tapered fairing elements 32 are molded of butyl rubber or other similarly flexible elastomeric synthetic plastic material. These fairings 32 are provided with a central recess or passage 36 that is accessible through a slit 38, and are formed at the larger ends with a reduced diameter portion 40 having an annular rib 42.

The central element or transducer housing 34 is molded of a rigid plastic material in the form of a hollow cylinder having a central bore 44 of substantially the same diameter as the reduced portions 40 of fairing elements 32 and adapted to receive a hydrophone or other transducer 46. The bore 44 is provided, adjacent the ends thereof, with annular grooves 48 that are engageable by the ribs 42 and serve to retain the fairing elements when assembled with the transducer housing 34. It will be noted that the length of each tapered fairing 32 is approximately twice the length of the cylindrical housing 34 and approximately four times the diameter thereof.

The transducer 46 comprises a body 48 including a piezoelectric element and any desired associated electronics such as preamplifier means, or the like. The body 48 is encased in a butyl rubber jacket 50 having a plurality of radially extending bosses or projections 52 formed therewith. These projections 52 have reduced diameter outer ends that engage in corresponding openings 54 in the side wall of the cylindrical housing 34 and serve as resilient stand-off supports for the transducer 46. The transducer 46 is thereby resiliently held in predetermined spaced relation to the inner surface of the housing 34 and is protected against physical shock or strain by impact or deformations that may occur to the housing 34 during handling and use of the device 10.

The transducer 46 is provided at one end with lead wires or conductors 60 extending into the passage 36 of the fairing 32 and ending in terminal pins or plugs 62. The plugs 62 are adapted to engage corresponding sockets 64 on wires or conductors 66 that have been brought into the passage 36 of the fairing 32 from a strand 20 of the cable 12 via the slit 38 of that fairing.

In some systems it is desirable to connect a plurality of transducers in series using one wire of one pair of wires in a strand 20, and to have the other wire of the pair electrically bypass the transducer. This can be facilitated by providing the transducer 46 with sockets 70 at the end opposite the leads 60. These sockets 70 receive terminal pins or plugs 72 on wires 66 led from a strand 20 to the interior of the fairing 32 adjacent the socket end of the transducer. One of the sockets 70 may be internally directly connected as shown by line 74 to one of the leads 60, thereby avoiding the need of threading a wire through the housing past the transducer, or of providing protection for such a wire.

In the preferred embodiment, the eight strands 20 of the eight strand cable 12 each comprise a wire bundle 76 surrounded by a hollow, braided cover 78. The wire bundles each comprise six twisted conductor pairs, such as wires 62, helically wrapped around a central elastic core. Each strand 20 is conveniently identified by a colored yarn incorporated into the braided cover 78, while each conductor pair is identified by its own color.

During manufacture, the four pairs of strands 20, with their respective internal wire bundles, are braided on a conventional braiding machine. If the desired positions of transducer stations 14 are known, wires 62 from a predetermined wire bundle are pulled through the cover 78 of a selected strand 20, severed, and pins and sockets 64,72 applied as needed. The braided strands 20 are then expanded and a transducer mount 30 with a transducer 46 is slipped between the strands. The mount is preferably positioned so that the slits 38 are aligned with locations where the pairs of strands 20 cross one another, and the wires 62 are preferably pulled from their strand cover 78 at such a location. The fairings 32 then can be flexed open at the slits 38 for leading of the wires into the passage 36 and connection of the wires 62 to the appropriate transducer terminals. If necessary, the fairings can easily be temporarily separated from the housing 34 to facilitate connection.

Thereafter, the braided eight cable strands 20 and the included transducer mounts 30 are run through a braiding machine for application of the cover 22 and, if needed, the fiber fairing tufts 16 are then fixed in place.

In the event it is desired to add or remove a transducer station 14, the cover 22 can be cut away as shown in FIG. 2, and the transducer mount 30 removed or inserted as described above. The removed cover 22 can then be closed as by braiding a new section of cover or by lacing a canvas cover section over the zone from which the cover 22 was removed.

The resulting electroacoustic cable or line array is notably small in diameter at the transducer stations, is strong, light, and highly flexible so that bending moments, occurring as the cable passes over sheaves, do not damage the transducer stations or wire conductors. It is also particularly versatile in use in that transducer stations can be added and removed without any special tools. The entire structure of the device 10 is free flooding and so is insensitive to ambient pressures without need of additional potting compounds, oil chambers, or the like.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A flexible, condition responsive cable device comprising in combination:
   a plurality of strands braided together to form a hollow cable having a tendency to expand under axial compression and to constrict when under tension;
   said strands being formed of synthetic fibers characterized by high resistance to stretch;
   at lease one of said strands comprising a hollow braid;
   conductor means for carrying electrical signals, said conductor means being disposed within said one of said strands;
   an elongate transducer mount disposed within an expanded portion of said cable and comprising a rigid, hollow transducer housing and a pair of resiliently flexible, tapered fairings extending from opposite ends of said housing;
   said housing having a central bore and said tapered fairings each having a central passage communicating with said bore;
   transducer means, disposed in said bore and comprising terminal means;
   said conductor means leading from within said one strand through said fairing and connected to said terminal means.

2. A flexible, condition responsive cable device as defined in claim 1, and wherein:
   said transducer housing comprises a cylindrical wall of a predetermined outside diameter and formed of a rigid plastic material;
   said tapered fairings each have a reduced portion at the larger end thereof adapted to be snugly received in said bore of said housing; and
   said tapered fairings each having a length approximately four times said outside diameter of said housing.

3. A flexible, condition responsive cable device as defined in claim 2, and wherein:
   said transducer means comprises a transducer body, a plurality of elastomeric projections extending radially from said body and engaging said housing cylindrical wall, whereby said transducer body is resiliently suspended in spaced relation to the interior of said housing wall.

4. A flexible, condition responsive cable device as defined in claim 3, and wherein:
   said housing and said reduced portions of said tapered fairings are characterized by cooperating rib and groove means for releasably retaining said housing and fairings in assembled relation.

5. A flexible, condition responsive cable device as defined in claim 4, and wherein:
   said tapered fairings are characterized by a slit from the exterior thereof to said central passage thereof for accommodating said conductor means.

6. A flexible, condition responsive cable device as defined in claim 5, and further comprising:
   a braided cover ensheathing said cable strands.

7. A condition responsive cable device of the type comprising a plurality of discrete transducer stations, said device comprising in combination:
   a hollow braided cable comprising four pairs of hollow braided strands;
   said strands being braided of synthetic fibers characterized by resistance to elongation under tension;
   a free flooding, bendable, sensor mount disposed coaxially within an expanded portion of said cable at each of said transducer stations;
   each of said mounts comprising a hollow cylindrical transducer housing having a predetermined outside diameter, and a pair of substantially cone shaped resiliently flexible, hollow rubber fairings extending from opposite ends of said housing and tapering from said outside diameter of said housing to an apex over a length of approximately four times said diameter; and
   a transducer resiliently supported within said housing, said transducer having a plurality of terminals for effecting electrical connection thereto;
   said cable comprising a plurality of electrical conductors within said hollow braided strands, a plurality of said conductors leading from within said strands into at least one of said hollow fairings and to said terminals.

8. A condition responsive cable device as defined in claim 7, and wherein:
   said cylindrical housing is formed of a rigid synthetic plastic material and has a wall defining a central bore characterized by an annular groove adjacent each end thereof; and
   said fairings each comprising a reduced portion at the larger end thereof, said reduced portion being characterized by an annular rib complementary to said annular grooves in said bore of said housing, and cooperable therewith to releasably retain said fairings and said housing in assembled relation.

9. A condition responsive cable device as defined in claim 8, and wherein:
   said strands are each characterized by a yarn of characteristic, strand identifying color; and
   said electrical conductors comprise a plurality of twisted wire pairs each characterized by an insulative covering of wire identifying color.

10. A condition responsive cable device as defined in claim 9, and wherein:
    said transducer comprises terminal means at opposite ends thereof whereby electrical by-pass can be effected without leading a wire between said transducer and said housing wall.

11. A condition responsive cable device as defined in claim 7, and wherein:
    said housing has a wall defining a central bore characterized by a predetermined inside diameter;
    said transducer comprises a body and a plurality of radially extending elastomeric projections engaging said wall and resiliently supporting said transducer body in predetermined spaced relation to said housing wall.

* * * * *